United States Patent [19]
Ryan et al.

[11] Patent Number: 5,337,416
[45] Date of Patent: Aug. 9, 1994

[54] APPARATUS FOR MANAGING PAGE ZERO ACCESSES IN A MULTI-PROCESSOR DATA PROCESSING SYSTEM

[75] Inventors: Robert P. Ryan, Marlborough, Mass.; John B. Crowther, Nashua; Robert A. MacDonald, Derry, both of N.H.

[73] Assignee: Wang Laboratories, Inc., Lowell, Mass.

[21] Appl. No.: 154,675

[22] Filed: Nov. 18, 1993

Related U.S. Application Data

[63] Continuation of Ser. No. 534,392, Jun. 7, 1990, abandoned.

[51] Int. Cl.$^5$ ............................................. G06F 12/00
[52] U.S. Cl. ............................... 395/400; 364/DIG. 1; 364/DIG. 2
[58] Field of Search ............... 395/400, 425, 200, 800; 364/200 MS File, 900 MS File, DIG. 1, DIG. 2

[56] References Cited

U.S. PATENT DOCUMENTS

| | | | |
|---|---|---|---|
| 3,317,898 | 5/1967 | Hellerman | 365/49 |
| 3,555,513 | 1/1971 | Hauck et al. | 365/49 |
| 3,982,231 | 9/1976 | Bernstein et al. | 395/425 |
| 4,128,881 | 12/1978 | Yamamoto et al. | 395/400 |
| 4,325,116 | 4/1982 | Kranz et al. | 395/400 |
| 4,413,315 | 11/1983 | Kurakake | 395/400 |
| 4,799,187 | 1/1989 | Einarson et al. | 395/400 |
| 4,992,976 | 2/1991 | Yonekura et al. | 395/500 |
| 5,204,949 | 4/1993 | Yasue et al. | 395/200 |

FOREIGN PATENT DOCUMENTS 0332911  9/1976  European Pat. Off. .

OTHER PUBLICATIONS

IBM Technical Disclosure Bulletin, vol. 23, No. 4, Sep. 1980, New York, "Prefix Address Control In a Tightly Coupled Multiprocessor" p. 1568 lines 1-14.

The 10th Annual International Symposium on Computer Architecture, Conference Processings, Philipson, et al: "A Communication Structue for a Multiprocessor Computer with Distributed Global Memory", pp. 334-340.

*Primary Examiner*—Glenn Gossage
*Assistant Examiner*—Jack A. Lane
*Attorney, Agent, or Firm*—Kenneth L. Milik

[57] ABSTRACT

Apparatus for use in a multi-CPU data processing system (10) wherein each CPU (12-18) is coupled to a common bus (20) and through the common bus to a main memory (28). The apparatus provides a program, such as an operating system, that is operating upon each of the CPUs access to a page of data within the main memory. Each of the CPUs generates a first address for identifying a memory location or locations within a page of the main memory. The first address is modified as a function of the first address and as a function of an identification of the CPU to generate a second address for identifying a memory location or locations that are either within the same page or within another page of the main memory. The modified second address is applied to the memory for accessing the memory location or locations.

7 Claims, 2 Drawing Sheets

5,337,416

APPARATUS FOR MANAGING PAGE ZERO ACCESSES IN A MULTI-PROCESSOR DATA PROCESSING SYSTEM

This is a continuation of copending application Ser. No. 07/534,392 filed on Jun. 7, 1990, now abandoned.

FIELD OF THE INVENTION

This invention relates generally to digital data processing systems and, in particular, to a apparatus for managing accesses to a system memory by a plurality of data processors concurrently executing programs each requiring a predefined, reserved memory area.

BACKGROUND OF THE INVENTION:

Most, if not all, operating system programs for use with digital data processors require a reserved area of system read/write memory for the storage of operating system-related data such as device tables, interrupt vectors and so on. In many systems this reserved area of memory is predefined to be a "lowest" page of physical memory, often referred to as "page zero". Page zero will extend across a physical address range of zero to some larger address such as 1023 or 2047. The use of page zero for such operating system functions is advantageous if for no other reason than many data processors have a special form of addressing for page zero that includes a shorter instruction length resulting in a faster instruction fetch and execution.

A problem is created for those types of systems characterized as a multi-processor system wherein a plurality a data processors, each of which executes an associated controlling program such as an operating system, are coupled to a common system memory. Each of the data processors requires access to an associated page zero within the common memory. However, in that each of the data processors may be operating independently of the other data processors the processors cannot be allowed to "share" the page zero memory area. For example, if one of the data processors were to modify the page zero data the modified data may be inappropriate for use by the other data processors.

It is therefore an object of the invention to provide an apparatus for use in a multi-processor data processing system for enabling each of the processors to access an associated predefined region of system memory.

It is another object of the invention to provide an apparatus for use in a multi-processor data processing system for providing each of the processors an associated "page zero" within system read/write memory to enable concurrent execution of programs without conflict by the data processors.

It is a further object of the invention to provide a data processing system having n data processors each running a program requiring a predetermined region of system read/write memory and to also provide n regions of system memory each of which is mapped to appear, to an associated processor, as the predetermined region of system memory.

It is a still further object of the invention to provide a data processing system having n data processors each running a program requiring a page zero region of system read/write memory and to also provide n effective page zero regions of memory to enable concurrent program execution by the data processors.

SUMMARY OF THE INVENTION

The foregoing problems are overcome and the objects of the invention are realized by an apparatus for use in a data processing system of the type that includes n data processors where n is greater than one. Each of the data processors executes instructions including instructions that generate a first address for accessing a predetermined region of system memory. The apparatus includes, for each of the data processors, circuitry for modifying the first address to a second address. The circuitry includes a first input for receiving the first address, a second input for receiving an identification of the data processor, and an output for providing the second address therefrom. The second address is a function of the first and the second inputs.

In a presently preferred embodiment of the invention n equals from one to four. The identification (ID) of each of the data processors is expressed in binary as 00, 01, 10 or 11 and the predetermined region of system memory is a memory PAGE0. The circuitry modifies the first address for accessing one of n memory pages (PAGE0, PAGE1, PAGE2 or PAGE3) in accordance with the following table:

| FIRST ADDRESS | ID=00 | ID=01 | ID=10 | ID=11 |
|---|---|---|---|---|
| PAGE0 | PAGE 0 | PAGE 1 | PAGE 2 | PAGE 3 |
| PAGE1 | PAGE 1 | PAGE 0 | PAGE 1 | PAGE 1 |
| PAGE2 | PAGE 2 | PAGE 2 | PAGE 0 | PAGE 2 |
| PAGE3 | PAGE 3 | PAGE 3 | PAGE 3 | PAGE 0. |

A data processor other than the data processor having the ID=00, when generating a first address that targets physical PAGE0, has the address modified such that another page of memory is accessed instead. As a result, each of the system data processors has an associated PAGE0 region of system memory. Thus each of the data processors concurrently executes an operating system that requires exclusive use of PAGE0 without requiring modification of the operating system. Furthermore a data processor is enabled to read, if desired, PAGE0 information relating to another of the operating systems executing on another of the data processors.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The following description is made in the context of a multi-processor system wherein each of the processors executes an operating system known as the VS operating system provided by Wang Laboratories, Incorporated of Lowell, Mass. However, it should be realized that the use of the invention is applicable to a wide variety of data processing systems employing other operating systems. For example, the use of the invention is also applicable to a multi-processor system employing a plurality of embedded data processors having controlling programs executed from ROM, the data processors being coupled to a common memory. As such, the practice of the invention is not intended to be limited solely to the presently preferred embodiment disclosed below.

Figure 1:
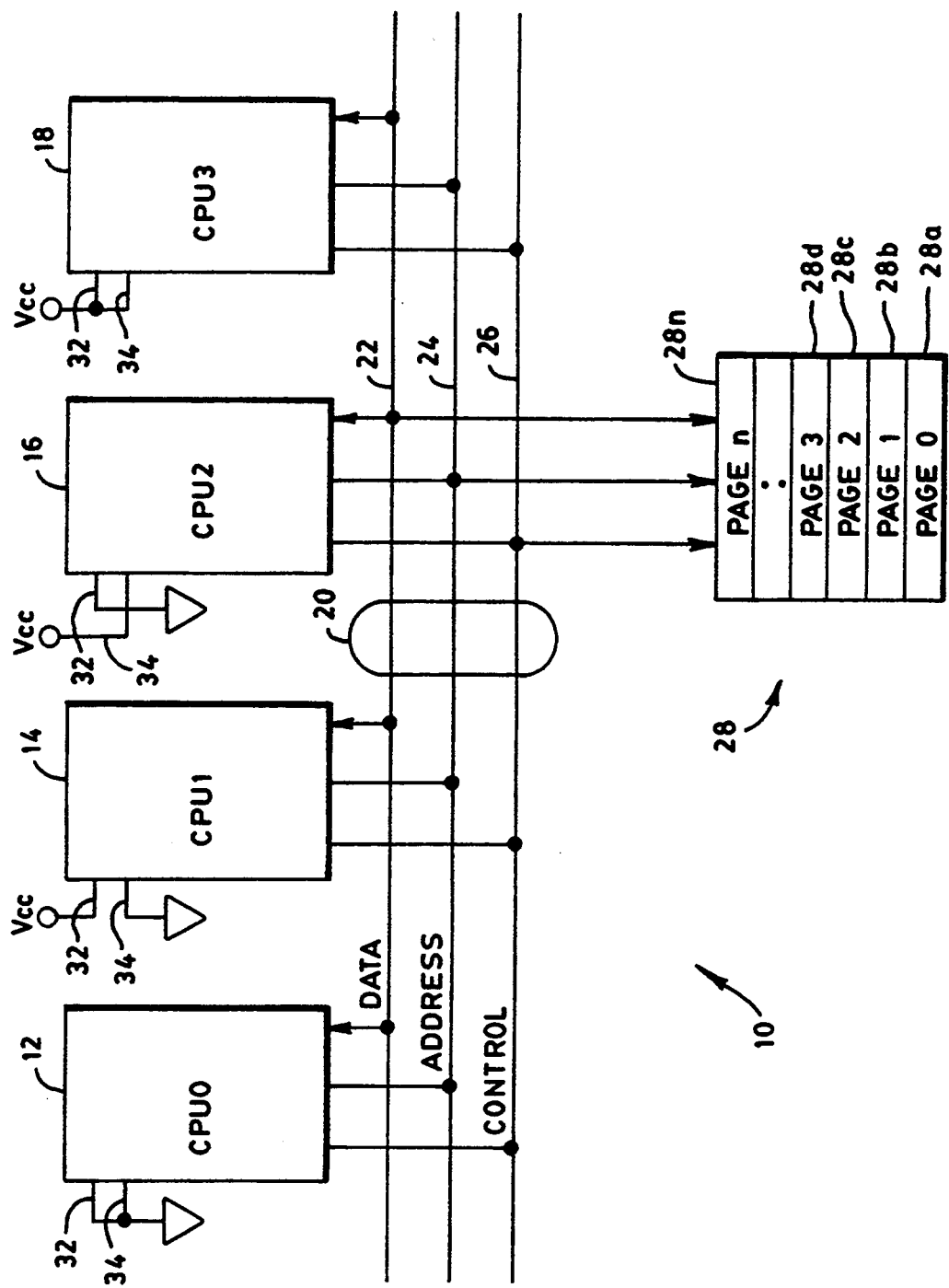
FIG. 1 is a block diagram illustrating a multi-processor data processing system constructed and operated in accordance with the invention.

Referring now to FIG. 1 there is shown a portion of a multi-processor data processing system 10. System 10 includes a plurality of bus agents such as data processors CPU0 12, CPU1 14, CPU2 16 and CPU3 18. Each of the CPUs 12-18 is of substantially identical construction and each executes a substantially identical version of the VS operating system. Each of the CPUs includes instruction fetch and decode circuitry, address generation circuitry, arithmetic/logic circuitry and other circuits for performing operations as directed by stored instructions. Each of the CPUs 12-18 is coupled to a system bus 20. The system bus 20 includes a plurality of data signal lines 22, address signal lines 24 and control lines 26. By example, the data signal lines 22 include 64 discrete signal lines and associated parity signal lines. Address signal lines 24 include 28 address lines. The control signal lines 26 include memory read and write strobes, system clocks, system bus arbitration signal lines and other known types of signals. During operation each of the CPUs operates to generate physical addresses for application to the system bus 20, the physical addresses being generated by a virtual address to physical address translation unit (not shown) that forms a portion of each of the CPUs.

Each of the CPUs 12-18 includes a mechanism for defining a CPU identification (ID) value, the ID value being a function of where the CPU is physically installed upon a common system backplane or motherboard. For the four CPU system shown two input signal lines are employed for this identification function and are defined as CPUID0 32 and CPUID1 34. These two lines are electrically coupled to logic signals hardwired on the backplane such that when a CPU is physically and electrically installed within a mating connector or connectors provided upon the backplane the ID value is provided to the CPU. These logic signals are shown schematically in FIG. 1 as being circuit ground and circuit power (Vcc) for expressing a logic zero and a logic one, respectively. CPUID0 32 and CPUID1 34 thus together express a two digit binary value. Depending upon the implementation this value could be expressed in two's complement or in any suitable format.

Also coupled to system bus 20 is a system read/write memory (Main Memory) 28 that is comprised of a plurality of pages (PAGE0 28a-PAGE in 28n) of memory storage locations. In the VS operating system each page is defined to be 2048 bytes (2Kbytes) in length. Thus, PAGE0 28a occupies an addressable region of memory from address 0-2047, PAGE1 28b occupies a region from address 2048-4095, etc.

The VS operating system requires physical PAGE0 28a (addresses 0-2047) as storage for operating system data structures and other operating system-related data. However, it can readily be seen that if each of the CPUs 12-18 is executing a separate VS operating system only one of the CPUs 12-18 is enabled to actually be coupled to the physical PAGE0 of the system memory 28. Without the benefit conferred by the use of the invention it would be required to modify the operating systems of the other CPUs to use another region of memory instead of PAGE0 28a or to make some other type of modification. However, it is usually desirable that any such modifications to standard software systems be avoided. Furthermore, other problems may result if additional CPUs were subsequently added to the system 10 to increase the capability of the system.

Figure 3:
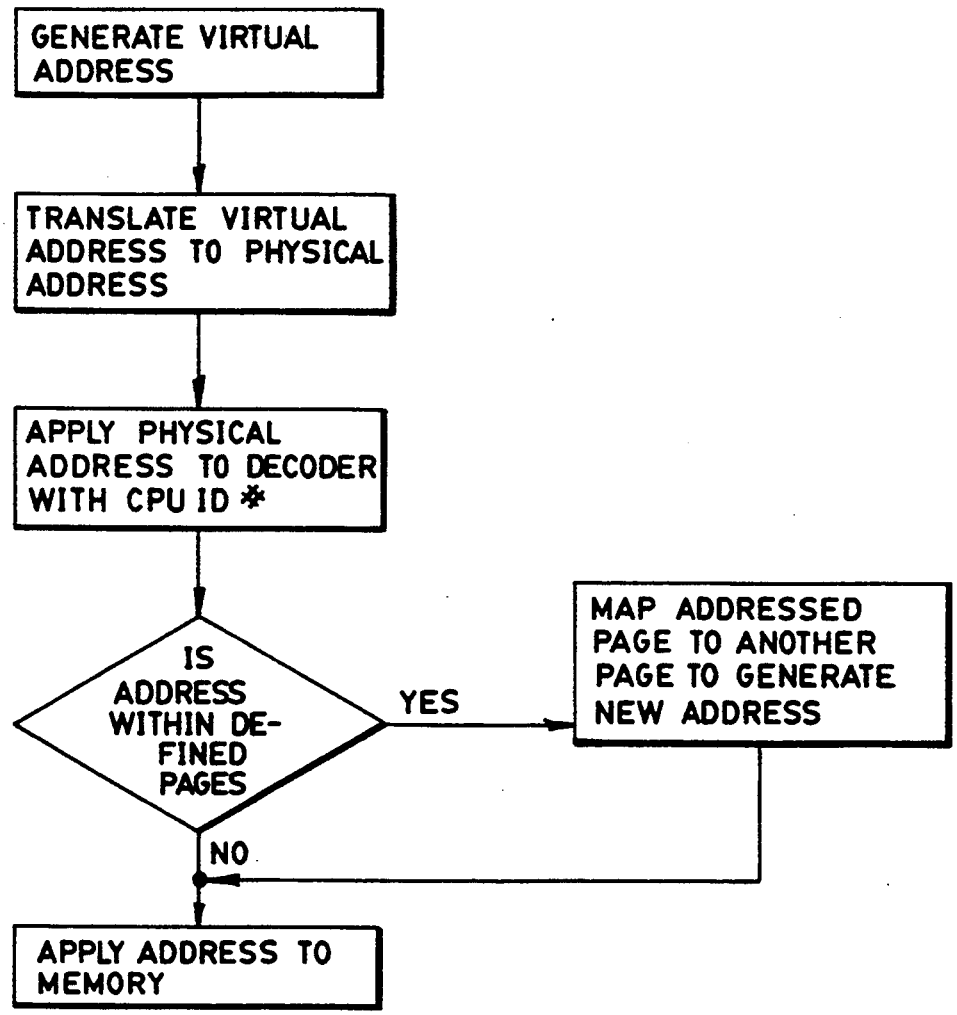
FIG. 3 is a flow chart illustrating a method of the invention.
Figure 2:
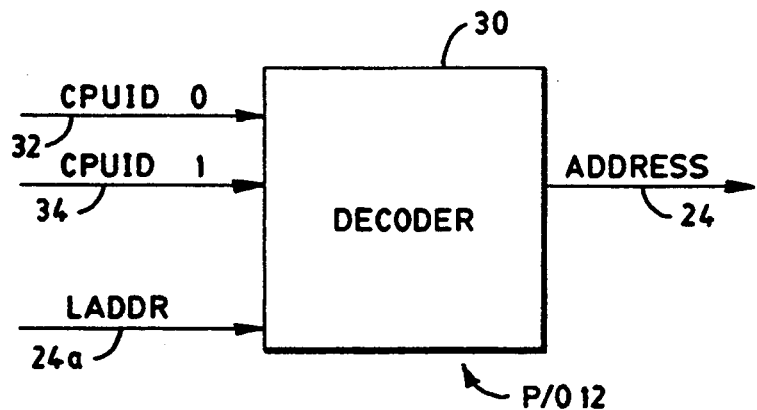
FIG. 2 is block diagram illustrating a page zero access decoder having an address output for coupling to a system memory.

Referring now to FIGS. 2 and 3 there is shown, in accordance with the invention, a PAGE0 decoder 30 that forms a portion of each of the CPUs 12-18 and a method of employing same, respectively. The particular decoder 30 shown in FIG. 2 forms a part of the CPU0 12. The decoder 30 may be implemented as a group of discrete logic devices, as a pre-programmed read only memory, as a programmable logic array (PLA) or in a number of other suitable hardware embodiments. In the presently preferred embodiment of the invention the decoder 30 is implemented as a PLA. Decoder 30 includes a plurality of CPU local address (LADDR) 24a signal line inputs and also the aforementioned CPUID signal lines, specifically CPUID0 32 and CPUID1 34. Outputs of decoder 30 include the plurality of system bus address lines 24. The LADDR 24a signal lines are those provided as outputs of the virtual address to physical address translation unit (not shown) that translates virtual memory addresses generated by the CPU into the physical ADDRESS 24 signal lines.

In the presently preferred embodiment of the invention the first four pages (8Kbytes) of physical memory 28 are permanently allocated memory locations. The decoder 30 employs the CPUID bits, in conjunction with the LADDR 24a inputs, to map these first four pages of system memory 28. The following TABLE 1 shows a presently preferred mapping scheme for the first four pages of system memory 28 as viewed by each of the CPUs 12-18.

TABLE 1

| LADDR | CPUID=00 | CPUID=01 | CPUID=10 | CPUID=11 |
| --- | --- | --- | --- | --- |
| PAGE0 28a | PAGE 0 | PAGE 1 | PAGE 2 | PAGE 3 |
| PAGE1 28b | PAGE 1 | PAGE 0 | PAGE 1 | PAGE 1 |
| PAGE2 28c | PAGE 2 | PAGE 2 | PAGE 0 | PAGE 2 |
| PAGE3 28d | PAGE 3 | PAGE 3 | PAGE 3 | PAGE 0 |

As can be seen, the CPU identified with CPUID=00 does not remap the first four pages of system memory 28. That is, the PAGE0 for CPU0 12 is the actual physical PAGE0 28A of memory 28, PAGE1 is physical PAGE1 28b, etc. However, CPU1 14 maps its associated PAGE0 to PAGE1 28b in memory 28 and maps its associated PAGE1 to PAGE0 28A. CPU2 16 maps its PAGE0 to PAGE2 28c in memory 28 and maps its PAGE2 to memory PAGE0 28A. Similarly, CPU3 18 maps its PAGE0 to PAGE3 28D and maps PAGE3 to PAGE0 28a. In addition, each of the CPUs 12-18 is preferably constrained from performing a WRITE access to its associated PAGE1-PAGE3 of system memory 28 in order to avoid inadvertently modifying another CPUs page zero data. Addresses not associated with the lowermost four pages of system memory 28 pass through the decoder 30 and are not modified.

From the above it is apparent that a CPU other than CPU0, when generating an address that targets physical PAGE0 28a, modifies the address such that another page of memory is instead accessed. As a result, each of the system CPUs 12-18 has an associated PAGE0 region of system memory 28 and each of the VS operating systems can be executed, without modification, independently by the four CPUs. Furthermore a CPU is enabled to read, if desired, PAGE0 information relating to another of the operating systems executing on another of the CPUs.

It should be realized that the mapping scheme shown in TABLE 1 is but one suitable mapping arrangement. For example, TABLE 2 illustrates another suitable mapping arrangement.

TABLE 2

| LADDR | CPUID=00 | CPUID=01 | CPUID=10 | CPUID=11 |
|---|---|---|---|---|
| PAGE0 28a | PAGE 0 | PAGE 3 | PAGE 2 | PAGE 1 |
| PAGE1 28b | PAGE 1 | PAGE 0 | PAGE 3 | PAGE 2 |
| PAGE2 28c | PAGE 2 | PAGE 1 | PAGE 0 | PAGE 3 |
| PAGE3 28d | PAGE 3 | PAGE 2 | PAGE 1 | PAGE 0 |

Also, it should be realized that the actual memory pages employed may be other than the lowermost four pages and that, for example, accesses to pages zero through three could be mapped to pages four through seven or to pages 20 through 53.

Furthermore, the invention is suitable for use with other than four CPUs and can be employed with an arbitrary even or odd number of CPUs. There is no requirement that each CPU be executing the same operating system or controlling program, although in many multi-processor systems such is the case. Thus, while the invention has been particularly shown and described with respect to a presently preferred embodiment thereof, it will be understood by those skilled in the art that changes in form and details may be made therein without departing from the scope and spirit of the invention as expressed in the Claims that follow.

What is claimed is:

1. Apparatus for use in a data processing system of the type that includes n data processing means where n is greater than one, each of the data processing means executing instructions including instructions that generate a first address for accessing a predetermined region of system memory, said apparatus comprising:

n connection means individual ones of which are provided for physically and electrically coupling one of said data processing means to a system bus and, through said system bus, to said system memory, each of said n connection means providing respective identification signals to said one of said data processing means that is coupled thereto for uniquely identifying said one of said data processing means from others of said n data processing means; and means, in each of the data processing means, for modifying said first address to a second address, said modifying means having a first input for receiving said first address, a second input for receiving the respective identification signal, and an output for providing the second address therefrom, the second address having a value that is a function of the first and the second inputs wherein the identification signals comprise signal lines that originate from a backplane upon which said system bus is disposed, said signal lines expressing a binary number for uniquely identifying the data processing means that is coupled thereto.

2. Apparatus as set forth in claim 1 wherein the predetermined region of system memory is a predetermined page of system memory comprising a predetermined number of memory storage locations.

3. Apparatus as set forth in claim 2 wherein the predetermined page is page zero.

4. Apparatus as set forth in claim 3 wherein the predetermined number of memory storage locations equals 2048 bytes.

5. Apparatus as set forth in claim 2 wherein n equals up to four, wherein the respective identification signal (ID) of each of the data processing means represents a value, wherein the predetermined page is a MEMORY PAGE0), and wherein said means for modifying modifies the first address for accessing one of n MEMORY pages (PAGE0, PAGE1, PAGE2, or PAGE3) in accordance with the following table:

| FIRST ADDRESS | ID=0 | ID=1 | ID=2 | ID=3 |
|---|---|---|---|---|
| PAGE0 | PAGE 0 | PAGE 1 | PAGE 2 | PAGE 3 |
| PAGE1 | PAGE 1 | PAGE 0 | PAGE 1 | PAGE 1 |
| PAGE2 | PAGE 2 | PAGE 2 | PAGE 0 | PAGE 2 |
| PAGE3 | PAGE 3 | PAGE 3 | PAGE 3 | PAGE 0. |

6. Apparatus as set forth in claim 1, wherein:
each of said n data processing means includes means for mating to a connector; and
said n connection means includes a plurality of connectors that are coupled to a system backplane for mating to n of said data processing means.

7. Apparatus as set forth in claim 6, wherein said identification signals are hardwired on each of said plurality of connectors.

* * * * *